Feb. 9, 1954
F. R. ZEUZEM
2,668,743
RADIALLY SEPARABLE ANTIFRICTION BEARING
Filed Aug. 25, 1949
3 Sheets-Sheet 3
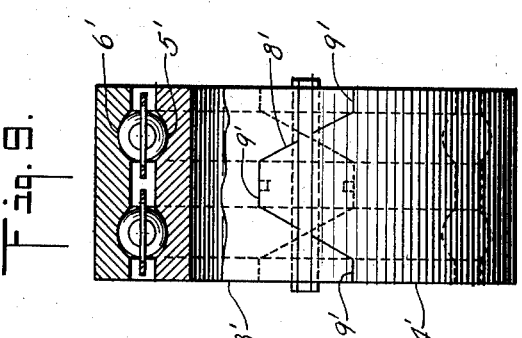
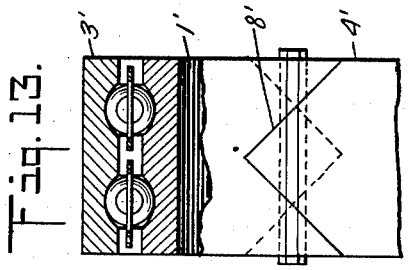
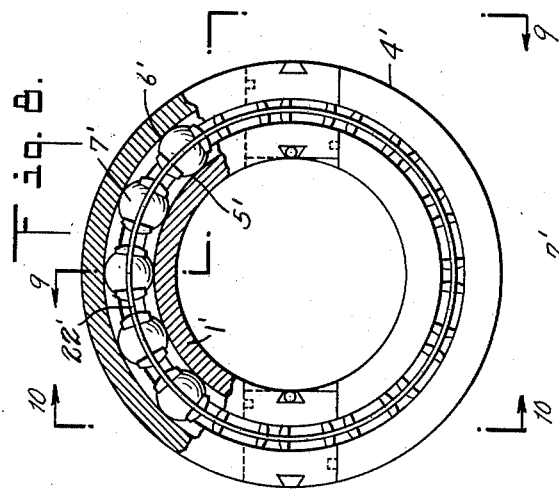
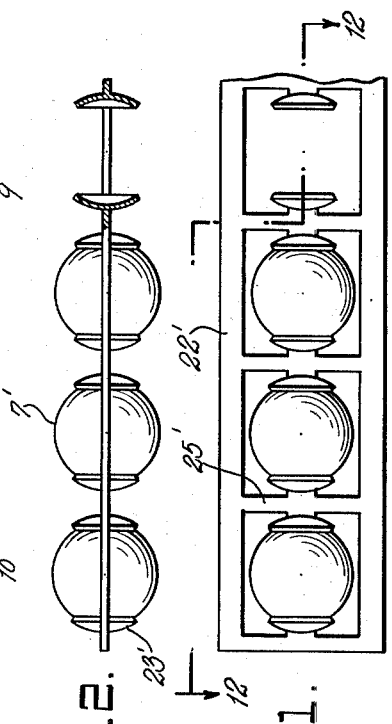
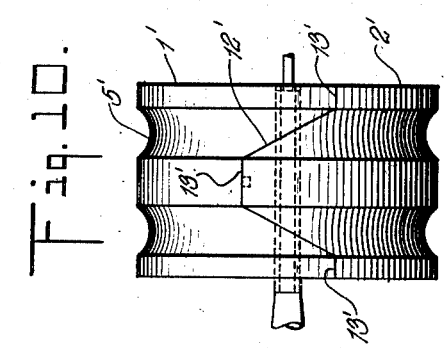
INVENTOR
FRIEDRICH ROBERT ZEUZEM
BY
Kenyon & Kenyon
ATTORNEYS Patented Feb. 9, 1954

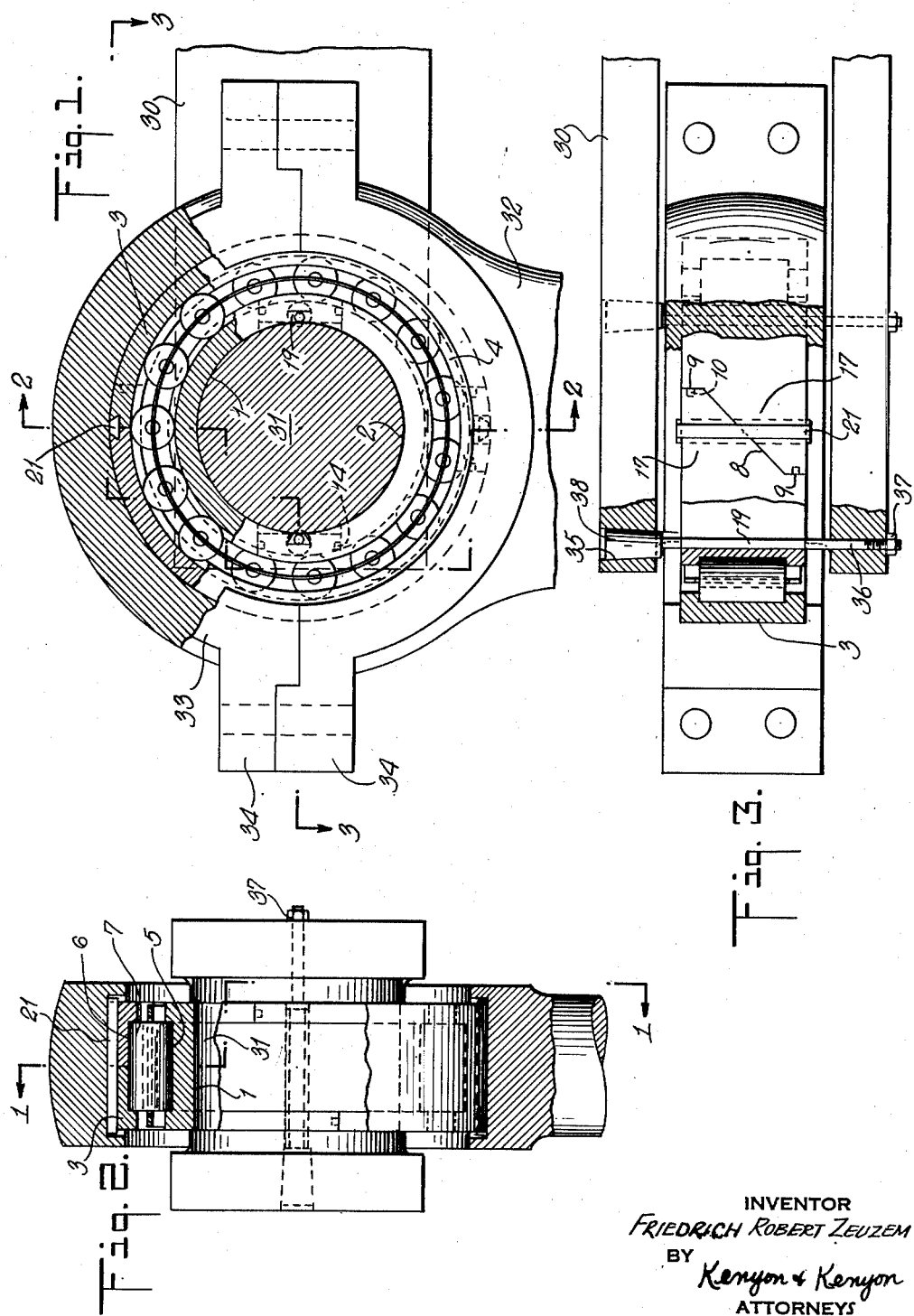

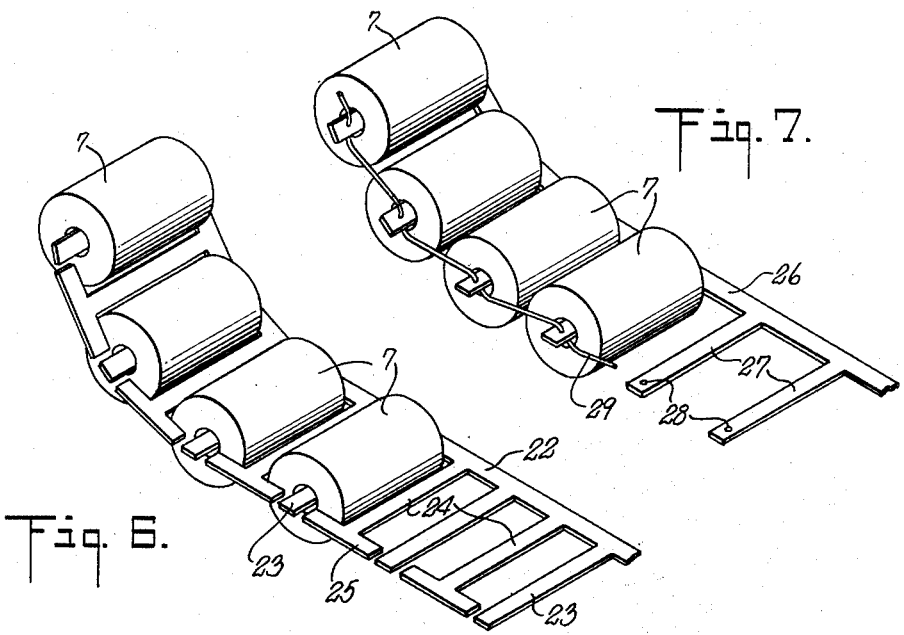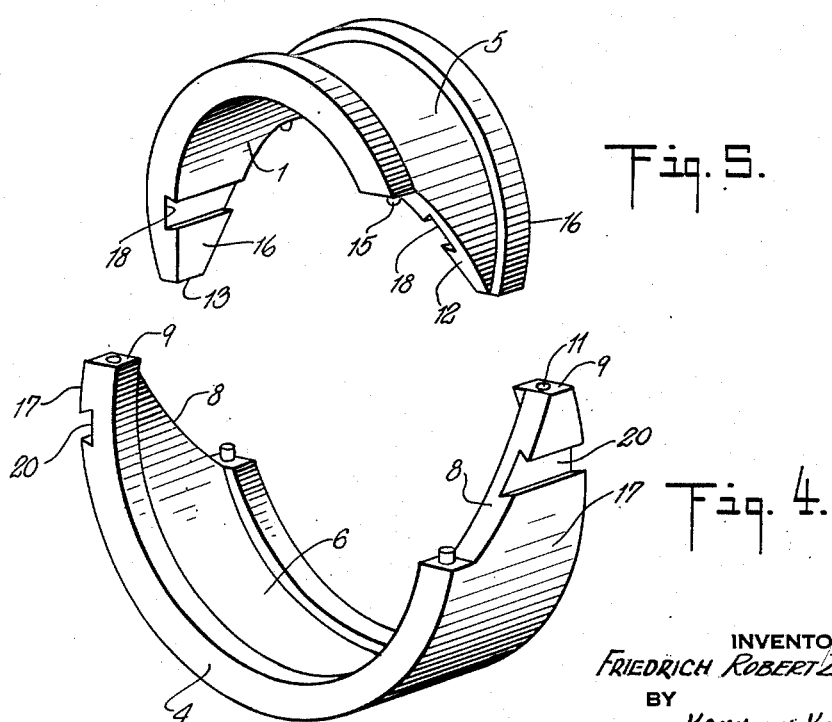

2,668,743

UNITED STATES PATENT OFFICE 2,668,743

RADIALLY SEPARABLE ANTIFRICTION BEARINGS

Friedrich Robert Zeuzem, Frankfurt am Main, Germany, assignor of one-half to Herman Wollner, New York, N. Y.

Application August 25, 1949, Serial No. 112,212

3 Claims. (Cl. 308—179)

This invention relates to radially separable anti-friction bearings. This type has the rings which provide the raceways for the rolling elements, made of radially separable interfitting segments. This segmental construction permits the bearing to be applied to and removed from a shaft having its ends blocked so that the usual solid ring type of anti-friction bearing cannot be applied to it because the bearing cannot be slid over the end of the shaft.

Heretofore bearings of this segmental construction have had the disadvantage that the rolling elements are subjected to considerable shock and vibration as they ride over the lines of separation between the segments which must cross the raceway surfaces on which the rolling elements roll. One object of the present invention is to provide this type of bearing in a form reducing or eliminating this shock and vibration.

Prior art bearings of the type mentioned involve a problem in interfastening the segments of the respective rings, and a further object of the present invention is to provide a better solution to this problem than is afforded by the prior art. Other objects may be inferred from the following.

Specific examples of bearings constructed in accordance with the principles of the present invention are illustrated by the accompanying drawings and described hereinbelow. This is for the purpose of explaining the principles and operation of the invention. Once these principles are understood they may be incorporated in other forms than are involved by these specific examples.

In the accompanying drawings:

Fig. 1 is a sectional view of a first example of the bearing showing it journaling a connecting rod on the crankpin of a crankshaft;

Fig. 2 is a sectional view taken on the line 2—2 in Fig. 1 and showing by the line 1—1 the line on which Fig. 1 is taken respecting Fig. 2;

Fig. 3 is a sectional view taken on the line 3—3 in Fig. 1;

Fig. 4 is a simulated perspective of one segment of the outer raceway ring;

Fig. 5 is a simulated perspective of one segment of the inner raceway ring;

Fig. 6 is a simulated perspective of a portion of a special roller and cage assembly;

Fig. 7 is the same kind of view showing a portion of a second example of the same kind of assembly as is shown by Fig. 6;

Fig. 8 is a sectional view similar to Fig. 1, but showing a second example and with the bearing uninstalled;

Fig. 9 is a sectional view taken on the line 9—9 in Fig. 8;

Fig. 10 is an elevation of the inner raceway ring of the example shown by Figs. 8 and 9 with the viewing direction indicated by the line 10—10 in Fig. 8;

Fig. 11 is a top view of Fig. 12; and

Fig. 12 is a side view showing a portion of the rolling element and cage assembly used by this second example;

Fig. 13 is a view similar to Fig. 9, but showing a third example.

In the first example, shown by Figs. 1 through 6, the inner raceway ring is made of two segments 1 and 2 and the outer raceway ring is made of two segments 3 and 4. The two rings are formed to provide mutually opposed raceway surfaces 5 and 6 which cooperatively form a raceway. The rolling elements are rollers 7. In each instance the segments of the respective rings are radially separable, interfitting segments which are constructed for radial application to and interfitting about a shaft. The lines of separation between the segments in each instance cross the raceway surfaces on which the rolling elements roll.

The mutually abutting ends of the segments 3 and 4 have slanting portions 8 positioned so the lines of separation formed by them, between the segments of the outer ring, cross the raceway surface 6 slanting respecting the rolling direction of the elements 7. As shown by Fig. 4 showing the segment 4, the slanting direction of the successive lines of separation thus formed are successivly reversed. They slant oppositely respecting each other. This is done by reversing the slanting direction of the portions 8.

The described mutually abutting ends of the outer ring segments also have right angular portions 9 positioned to butt together and brace the respective segments 3 and 4 against movement by wedge action of the slanting portions 8 when the segments are interfitted under circumferential pressure.

Each cooperating pair of the right angular portions 9 has a key pin 10 formed in one portion and a key pin receiving hole 11 formed in the other portion. This arrangement provides keys constructed and arranged to prevent relative slippage between the mutually abutting portions 9, but which permit separation thereof when the segments are radially separated.

The inner ring is correspondingly constructed, the slanting surfaces being shown at 12, the right angular abutting portions at 13, and the key means at 14 and 15 respectively. The slanting directions of the slanting portions 12 are also respectively reversed in this instance.

The described construction results in the mutually abutting ends of the respective ring segments providing mutually interfitting tapered tongues. Thus the segments 1 and 2 of the inner ring have the tongue 16 while the segments 3 and 4 of the outer ring have the tongues 17. These tongues extend more than 180° but may be relieved as required for their radial application and removal. This is immaterial in the case of the inner ring segment. The larger diameter of the outer ring reduces the need for relief and it may be eliminated when the parts are springy. The inside of the inner raceway ring opposite the raceway surface 5 has transverse grooves 18 crossing the mutually interfitting tongue 16 and provided with bars 19 slidably fitting therein to retain the tongues together. The grooves 18 have their sides inwardly flared and the bars 19 are correspondingly flared to provide a dovetail fitting effect preventing the bars from moving radially of the bearing from the grooves 18 when once driven home in these grooves 18. The bars 19 are shaped to act longitudinally as wedges so they can be driven home tightly in the grooves 18.

A similar arrangement is provided in the case of the outer ring. In this instance the grooves are shown at 20 and the bars at 21. In this instance the arrangement is provided on the outside of the ring segments because this is the side opposite the raceway surface 6.

Referring to Fig. 6, the rollers 7 are tubular and are mounted as a roller and cage assembly by means of a flexible strip 22 formed to provide shaft portions 23 positioned through the insides of the roller 7, and bracket portions 24 having cross bar ends 25 which hold the rollers 7 on the shaft portions 23. The bearing load is not carried by the cage so the latter may be made of flexible strip material and provided with just adequate strength to keep the rollers 7 together as an assembly. The flexibility of the strip material should be sufficient to permit the assembly to be bent in the manner of a flexible band or strap.

Fig. 7 shows a second arrangement wherein a similar strip 26 is provided but only with shaft portions 27, with the latter having holes 28 through which a wire 29 is woven to retain the rollers 7 from slipping off the ends of the shaft portions 27. Other arrangements may be used.

Figs. 1 and 2 show the bearing as it may be installed on the crankpin of a crankshaft to journal a connecting rod through the bearing. Thus these figures show the swinging ends 30 of the crank arms, the crankpin 31 and the bearing end of the connecting rod 32. The connecting rod is provided with the usual cap 33 and with flanges 34 through which the cap is fastened in position by machine screws or bolts in the usual fashion.

When the cap 33 is removed and the connecting rod 32 dropped the wedge bars 21 may be forced from the grooves 20 in the outer raceway ring segments. This releases the tongue portions 17 from each other so that the outer ring segments may be radially separated and removed. The rolling elements and cage assemblies of either Figs. 6 and 7 need not have their respective ends interconnected so they may be unwrapped from the inner raceway ring.

The wedge bars 21 can clear the crank arms 30, but this is not so in the case of the wedge bars 19 of the inner raceway ring. This necessitates a special arrangement best shown by Fig. 3. One of the crank arms 30 is provided with tapered holes 35 registering with the wedge bars 19. The wedge bars 21 of the outer ring are not much longer than the width of this outer ring, but the wedge bars 19 are longer affairs. They are long enough to extend through holes 36 formed in the crank arm opposite the one having the holes 35 and to be provided with threaded ends for this so that nuts 37 may be applied to them. The opposite ends of the bars 19 have tapered heads 38 that fit the holes 35 with a wedge action. Tightening of the nuts 35 draws the wedge shaped heads 38 into the holes 35 aided perhaps by force applied to the heads 38. Thus in this instance the bars 19 not only retain the ring segments in position but they anchor the inner raceway ring non-rotatively respecting the crankpin 31. The outer raceway ring may be anchored by providing it with means for keying with the encircling connecting rod parts. This latter arrangement may follow usual engineering practices.

Now it is clear that the inner ring segments may be unfastened by removing the nuts 37 and driving the bars 19 from their positions. In this instance the bars 19 need not function as wedges in the grooves 18, although a slight wedge effect is considered desirable to assure tightness. The bars 21 of the outer ring are frictionally retained in position by the wedge action and this should be kept in mind in designing their wedge contours.

Assembly of the bearing is considered clear enough to eliminate the need for description. However, it might be mentioned that if the bearing is designed as a needle bearing with needles substituted for the roller 7 the needles may be stuck into position in the raceway ring segments of each of the inner and outer rings by using heavy grease, paraffin or the like. The material used to obtain adherence and positioning of the needles during assembly of the bearing may subsequently be removed by a solvent or by heat in the case of paraffin or the like.

In operation the rolling elements 7 cross the lines of separation 8 and 12 in a diagonal manner. That is to say these lines of separation slant diagonally respecting the rolling directions of the elements. This reduces or eliminates the shock and vibration resulting when the rolling elements must roll across right angular lines of separation. Furthermore the successive lines of separation successively slant in opposite directions and this tends to prevent the development of any rhythmic vibration which might otherwise arise.

The end surfaces 18 provide the respective ring segments with ends shaped to form miter joints between the segments. The right angular portions are adjacent the axial ends of the segments and are free from the raceway segments 8. Due to the miter joint construction circumferential force applied to the abutting ends of the respective segments might tend to introduce displacing force to the segments axially of the bearing. A wedge action might occur. This may or may not be troublesome, but it is eliminated in any event by the right angular surfaces 9 and 13 which accept the circumferential force resulting from tightening of the parts and prevent its application in large quantities to the slanting portions 8 and 12. The key means further contribute to prevent relative shifting of the various segments.

Figs. 8 through 12 show a second example. The parts correspond to those of the first example and the corresponding parts are therefore similarly numeraled with the numbers primed for identification purposes.

A distinctive feature of this second example is that the ends of the respective ring segments are shaped to form double miter joints between the segments while additional sets of right angular surfaces 9' and 13' are provided each of the rings with this additional set positioned between the two miters of the double miters in each instance. In this instance a multiple ball bearing is involved so the raceways 5' and 6' are laterally spaced to clear the center one of the right angular portions 9' and 13' respectively. Thus again the raceway surfaces are crossed only by the slanting portions of the lines of separation.

In this instance the rolling elements 7' have cups 23' mounted by bars 25' supported between two lengthwise strips 22'. In this instance also the balls may be positioned by using grease, paraffin or the like, if the complications of cages are considered undesirable.

A third example is shown by Fig. 13 which is exactly like the just described second example illustrated by Figs. 8 through 12, excepting that the right angular surfaces 9' and 13' are eliminated. This lowers the cost of making the bearing. There may be some wedge action resulting when the ring segments are pushed towards each other but there will be not tendency towards relative axial displacement because of the double miter joint construction. Although a multiple ball bearing is shown in illustrating this last example, this plain double miter joint construction is also applicable to the use of rollers, pins or needles. For practical purposes the rolling elements will always be crossing slanting lines of separation between the segments.

It is to be understood that in these double miter joint constructions each ring is made with the tapered tongues. The miter joints of the segments of each ring are arranged to provide the effect of the lines of separation slanting oppositely in the case of each raceway. This results in each segment having a single tapered tongue at one end and two tapered tongues at the other.

Installation and removal of these succeeding examples of the invention may be carried out in the same manner as described in connection with the first example. The same mode of operation results with the same attendant advantages as were described in connection with the first example. Depending on design and service conditions one or another of the various examples may prove preferable.

I claim:

1. An anti-friction bearing including in combination superimposed rings having mutually opposed raceway surfaces and rolling elements positioned to roll between said rings on said raceway surfaces, said rings each being made of radially separable interfitting segments constructed for radial application to and interfitting about a shaft with at least major portions of the lines of separation between said segments formed to cross said raceway surfaces slantingly respecting the rolling direction of said elements, at least one of said rings having said segments formed with mutually abutting ends having slanting portions formed to provide said slanting portions of said lines of separation and right angular portions positioned to brace the respective segments circumferentially against movement by wedge action of said slanting portions when under circumferential pressure with said right angular portions having keys constructed and arranged to prevent relative slippage therebetween but separation thereof when said segments are radially separated.

2. An antifriction bearing including in combination superimposed rings having mutually opposed raceway surfaces and rolling elements positioned to roll between said rings on said raceway surfaces, said rings each being made of radially separable interfitting segments constructed for radial application to and interfitting about a shaft with at least major portions of the lines of separation between said segments formed to cross said raceway surfaces slantingly respecting the rolling direction of said elements, at least one of said rings having said segments formed with mutually abutting ends providing mutually interfitting tapered tongues with the side of said ring opposite said raceway surfaces having transverse grooves crossing said mutually interfitting tongues and provided with bars slidably fitting therein to retain said tongues together.

3. The combination of a connecting rod journal having two spaced crank arms, and an antifriction bearing inner raceway ring made in radially separable segments and having means for interfastening said segments requiring insertion through an end of said ring axially thereof, said crank arms having holes registering with said ring to pass said means thereto.

FRIEDRICH ROBERT ZEUZEM.

References Cited in the file of this patent

UNITED STATES PATENTS

| Number | Name | Date |
|---|---|---|
| 1,340,310 | Wolff | May 18, 1920 |
| 1,728,999 | Kuylenstierna | Sept. 24, 1929 |
| 1,742,513 | Leonard | Jan. 7, 1930 |
| 1,790,253 | Taylor | Jan. 27, 1931 |

FOREIGN PATENTS

| Number | Country | Date |
|---|---|---|
| 747,192 | France | June 12, 1933 |
| 628,106 | Germany | Mar. 28, 1936 |